Aug. 23, 1932.    A. EDMONSON    1,873,930
ELECTRIC TERMINAL
Filed Dec. 18, 1925
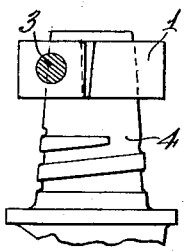
FIG. 1.
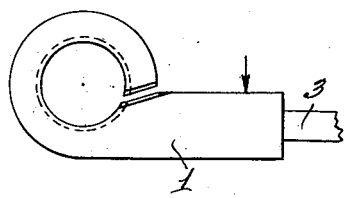
FIG. 2.
FIG. 4.
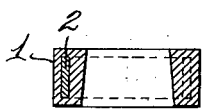
FIG. 3.
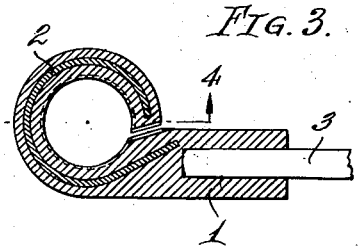
FIG. 5.
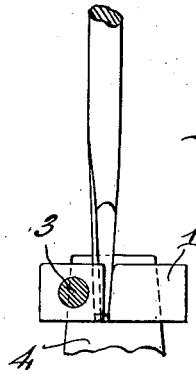
Inventor
Arthur Edmonson
By Brockett & Hyde
Attorneys Patented Aug. 23, 1932

1,873,930

UNITED STATES PATENT OFFICE

ARTHUR EDMONSON, OF CLEVELAND, OHIO, ASSIGNOR TO MORRIS MATSEN, OF OREGON, WISCONSIN

ELECTRIC TERMINAL

Application filed December 18, 1925. Serial No. 76,232.

This invention relates to means for establishing electric connections and has a special reference to terminal connections such as those for engagement with the terminals of storage batteries of the type generally employed in automobiles.

Such a battery is usually provided with heavy lead terminals projecting upwards from the battery, each of the terminals consisting of a short round tapered plug, the conduit to be connected therewith usually being provided with a heavy ring of lead open or split at one side of a shank portion to which the conduit is secured and the ring is tightly secured upon the battery terminal by a bolt passing through the ends of the ring whereby upon tightening of the bolt the ring is contracted around the terminal.

A common and serious difficulty with such an arrangement is the fact that the terminal connections are at all times subject to the fumes of the acid in which the battery plates must be immersed, and as sulphuric acid is universally employed for this purpose the corrosive effect of the fumes is very powerful, attacking and rapidly disintegrating most metals with which they may come in contact. Lead is the least expensive of metals having any appreciable resistance to the corrosive described and for this reason lead is commonly employed for each of the members by which these connections are made. Even lead, however, is not entirely resistant to the fumes of sulphuric acid, but forms salts upon surfaces exposed to the fumes under atmospheric conditions, which, besides weaking such a connection physically as they consume portions of the original metals, since the salts themselves are practically nonconductive of electricity and are equally liable to form and accumulate upon supposedly contacting surfaces between which the electrical connection is desired, clearly impairs the efficiency of the connection electrically as well.

One of the difficulties encountered by the use of lead is its extreme ductility and malleability. Moreover, owing to the weakness of lead a bolt of strong metal, such as steel, is required to tighten the conduit terminal upon that of the battery; and as the ferrus metals are very highly subject to the corrosion of sulphuric acid fumes this bolt is very soon entirely eaten away, or what is worse, just sufficiently so that the threads and heads become inoperative to either tighten or loosen the connection.

It is the object of this invention to provide a novel conduit terminal connection capable of application with the present standardized battery terminal, which shall present a surface exclusively of highly acid resistant metal but which shall be of sufficient strength to maintain close contact between the terminal members whereby a minimum of corrosion can take place between the contracting surfaces, yet of such novel design as to be readily secured upon the battery terminal without the use of any tools and readily tightened, loosened and removed without the aid of any tool other than a simple wedge such as a blade of a screw driver; and yet withal shall be of a very inexpensive construction.

The exact design, construction and operation of the terminal constituting my invention will be evident from reference to the following description taken in connection with the accompanying drawing in which Fig. 1 represents an end elevation of a terminal constructed according to my invention in place upon a battery terminal; Fig. 2 is a top view of the same terminal removed from the battery terminal; Fig. 3 is a sectional view in the plane of the drawing taken through the center of Fig. 2; Fig. 4 is a section along the line 4—4 of Fig. 3; Fig. 5 is a view similar to that in Fig. 1 showing a means of loosening the conduit terminal from the battery terminal.

In the drawing 1 represents generally my conduit terminal, which consists of a shank portion and an open ring portion of tapered bore, the shank extending approximately tangentially from one end of the ring as appears in Figs. 2 and 3, and the whole structure aligned with a plane, as appears in Fig. 1.

The terminal is made of some acid resisting material, preferably of lead. Since lead however, is practically without strength for the purpose intended, within the ring member of the terminal I provide a stiffening spring member 2 as appears in Figs. 3 and 4 of highly resilient material such as spring steel and of sufficient size, shape and strength to effectively support or back the comparatively large amount of the baser material, lead, with which it is surrounded. Since spring 2 is sufficiently short to lie entirely within the surrounding ring member but of such strength that the surrounding lead will be caused to conform with the spring in its resilient action, the effective result is a resilient ring of lead.

The shank member of the terminal is preferably counter-bored to receive an end of the conduit 3 as appears in Fig. 3, in which bore the conduit may be soldered or burned to secure electrical and mechanical connection therebetween.

Operation of the terminal is as follows: To secure the terminal upon a battery terminal, represented by that part of Fig. 1 indicated by the reference numeral 4, the conduit terminal is placed over the battery terminal until the corresponding tapered surfaces of the two terminals are in contact. A fairly snug mechanical connection may be thus obtained between the two co-acting terminals. For the purpose of accomplishing an electrical connection however, using its shank portion as a handle the conduit terminal is next given a slight twist in a "right hand" direction, as indicated by the arrow of Fig. 2. A slight tap with a light hammer may be given to the shank in the position and direction of the arrow referred to, where an exceptionally good contact is required, as where a large current flow is anticipated, meanwhile maintaining a slight downward pressure of the conduit terminal upon the battery terminal.

This motion, owing to the wedging effect of the battery terminal within the ring of the conduit terminal, the binding friction between the contacting surfaces, and the direction of the leverage of the shank portion of the conduit terminal somewhat spreads the ring against the action of the spring, and seats the ring about the battery terminal with a force sufficient to overcome slight irregularities in the soft lead surfaces; and the strength of the spring 2 is sufficient to maintain the perfect physical and electrical connection thus obtained between the parts.

Thereafter a tap or other force upon the shank but in the opposite or left hand direction effectively locks the terminal in seated position.

To disconnect the terminals, the conduit terminal is given a slight twist in the opposite direction, as by again using the shank portion as a handle, or by a slight tap upon the shank in the direction of the downwardly pointed arrow, when both the friction between the surfaces and the leverage of the shank tend to free the contacting surfaces, and owing to the taper the surfaces are loosened sufficiently for the easy removal of the conduit terminal.

Should the surfaces have become stuck together by corrosion to the extent that they are not readily separable as described, it is only necessary to insert a wedge such as the blade of a screw driver in the opening in the ring, and thus easily spread the ring sufficiently to loosen it upon the battery terminal.

While I have illustrated and described but one form of my invention I do not wish to be limited by this form, but merely by the actual scope of the invention as defined in the following claims:

What I claim is:

1. A cable terminal adapted to establish connection with a conical storage-battery post, said terminal comprising a split ring portion of soft non-corrosive metal having its opening tapering to receive the battery post, said portion being made resilient by a stiffening spring therewithin and surrounded by a substantial thickness of said soft metal, said terminal having a shank portion extending from one end of said ring portion, whereby, when said terminal is fitted over a battery post, movement of the terminal thereabout in one direction will tighten the fit and in the other direction will loosen the fit, when said movement is produced by forces applied through said terminal shank portion as a handle.

2. A cable terminal adapted to establish connection with a conical storage battery post, said terminal comprising a ring portion of soft non-corrosive metal having its opening tapered to receive the battery post, and a shank portion extending from said ring portion, said ring portion being split adjacent said shank portion in a plane nonradial of the ring and the ring being made resilient by a stiffening spring surrounded by a substantial thickness of said soft metal, whereby, when said terminal is fitted over a battery post, movement of the terminal thereabout in one direction will tighten the fit and in the other direction will loosen the fit, when said movement is provided by forces applied through the shank portion as a handle.

3. A heavy duty battery terminal comprising an open ended member made of spring material having considerable resiliency, said member including a battery terminal engaging portion having a substantially circular opening into which a battery terminal is received, said opening being, when the battery terminal engaging portion is in normal position, of a smaller diameter than the battery terminal which is to be received thereinto so that the spring material alone will cause the battery terminal engaging portion to engage the battery terminal with sufficient pressure to make a good electrical connection, the open ends of said member being in relatively close proximity to each other and having opposed tool-engaging surfaces, whereby said portion may, by separating the ends, be flexed to cause the opening therein to become larger than the battery terminal so that the terminal may be inserted into said opening, said member being coated with an acid resisting sheath.

4. A heavy duty battery terminal comprising an open ended member made of spring material having considerable resiliency, said member including a battery terminal engaging portion having a substantially circular opening into which a battery terminal is received, said opening being, when the battery terminal engaging portion is in normal position, of a smaller diameter than the battery terminal which is to be received thereinto so that the spring material alone will cause the battery terminal engaging portion to engage the battery terminal with sufficient pressure to make a good electrical connection, the open ends of said member being in relatively close proximity to each other, and having opposed tool-engaging surfaces, whereby said portion may, by separating the ends, be flexed to cause the opening therein to become larger than the battery terminal so that the terminal may be inserted into said opening, said member being coated with a layer of lead.

In testimony whereof I hereby affix my signature.

ARTHUR EDMONSON.